(12) United States Patent
Shiina et al.

(10) Patent No.: US 12,186,995 B2
(45) Date of Patent: Jan. 7, 2025

(54) JOINING APPARATUS FOR SHEET-LIKE MATERIALS

(71) Applicant: JUKI CORPORATION, Tama (JP)

(72) Inventors: Takayuki Shiina, Tama (JP); Norihisa Shiraishi, Tama (JP); Takaaki Iijima, Tama (JP)

(73) Assignee: JUKI CORPORATION, Tama (JP)

(*) Notice: Subject to any disclaimer, the term of this patent is extended or adjusted under 35 U.S.C. 154(b) by 136 days.

(21) Appl. No.: 18/111,683

(22) Filed: Feb. 20, 2023

(65) Prior Publication Data
US 2023/0264433 A1 Aug. 24, 2023

(30) Foreign Application Priority Data
Feb. 21, 2022 (JP) .................................. 2022-024394

(51) Int. Cl.
*B29C 65/78* (2006.01)
*B29C 65/00* (2006.01)
(Continued)

(52) U.S. Cl.
CPC ........ *B29C 65/7832* (2013.01); *B29C 65/086* (2013.01); *B29C 65/5042* (2013.01);
(Continued)

(58) Field of Classification Search
CPC .............. B29C 65/5092; B29C 65/749; B29C 65/7443; B29C 65/08; B29C 65/7832;
(Continued)

(56) References Cited

U.S. PATENT DOCUMENTS 3,796,625 A * 3/1974 Rutledge ........... B29C 66/73921
156/304.6
4,451,721 A * 5/1984 Nemeskeri ........ B29C 66/81431
219/777
(Continued)

FOREIGN PATENT DOCUMENTS

| EP | 2 404 741 A1 | 1/2012 |
|---|---|---|
| JP | 2002-273792 A | 9/2002 |
| JP | 5244052 B2 | 7/2013 |

OTHER PUBLICATIONS

Extended European Search Report issued Jun. 20, 2023 in Application No. 23157706.5.

*Primary Examiner* — Scott W Dodds
(74) *Attorney, Agent, or Firm* — Faegre Drinker Biddle & Reath LLP

(57) ABSTRACT

A joining apparatus includes a fusing mechanism part that joins two thermoplastic sheet-like materials by fusing, a sticking mechanism part that sticks an adhesive tape along a joined portion of the sheet-like materials, a workbench having a placement surface on which the fusing mechanism part and the sticking mechanism part are disposed side by side, the placement surface allowing the sheet-like materials in an unfolded state to be placed thereon, and a guide that allows an end portion to be joined of one of the sheet-like materials and an end portion to be joined of the other sheet-like material to overlap each other while aligned along a plane intersecting the placement surface, each of the end portions to be joined of the sheet-like materials being placed on the placement surface, and to feed the overlapping end portions to be joined. The fusing mechanism part fuses and joins the end portions.

7 Claims, 9 Drawing Sheets

(51) Int. Cl.
  *B29C 65/08* (2006.01)
  *B29C 65/50* (2006.01)
  *B29C 65/74* (2006.01)
  *A41H 43/04* (2006.01)

(52) U.S. Cl.
  CPC ........ *B29C 65/7443* (2013.01); *B29C 65/749* (2013.01); *B29C 65/7802* (2013.01); *B29C 66/03242* (2013.01); *B29C 66/0384* (2013.01); *B29C 66/1142* (2013.01); *B29C 66/133* (2013.01); *A41H 43/04* (2013.01); *B29C 65/7888* (2013.01); *B29C 65/7894* (2013.01); *B29C 66/73921* (2013.01); *B29C 66/845* (2013.01)

(58) Field of Classification Search
  CPC .......... B29C 65/5042; B29C 66/03242; B29C 66/1142; B29C 66/845; A41H 43/04
  See application file for complete search history.

(56) References Cited

U.S. PATENT DOCUMENTS

| | | | |
|---|---|---|---|
| 7,770,235 B2 * | 8/2010 | Lepage | B29C 66/432/82 |
| 8,741,412 B2 * | 6/2014 | Wangbunyen | B29C 65/5021 428/57 |
| 2008/0196136 A1 * | 8/2008 | Fellouhe | B29C 65/08 2/243.1 |
| 2009/0056870 A1 * | 3/2009 | Glenn | B29C 66/1352 156/304.7 |

* cited by examiner

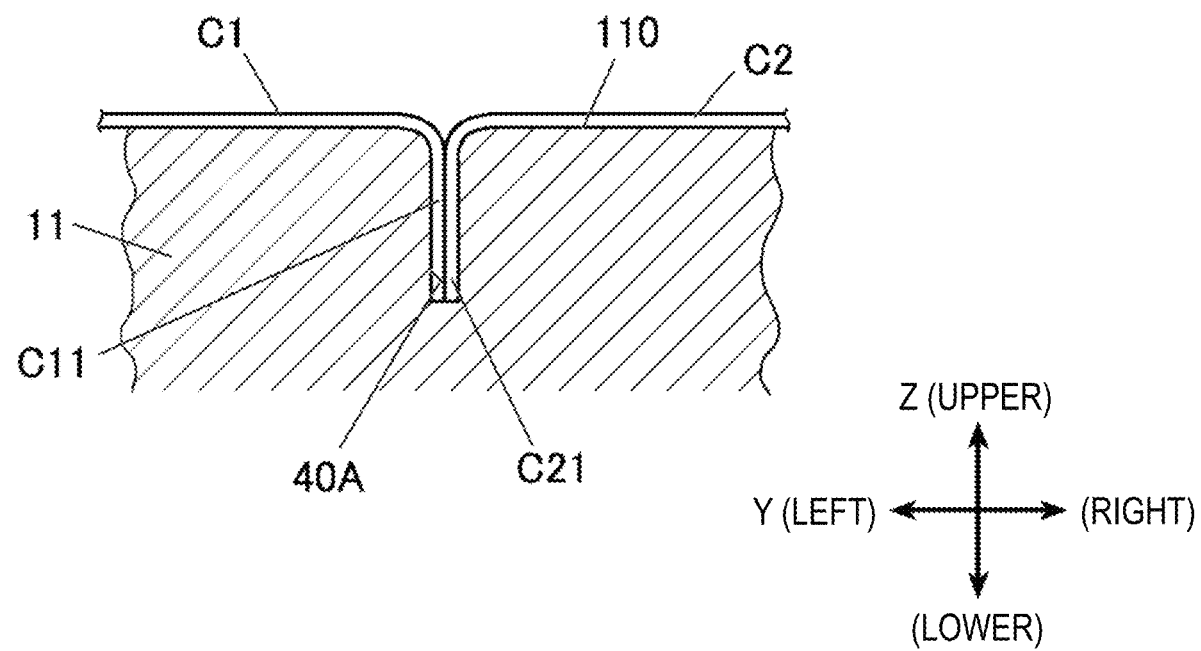

JOINING APPARATUS FOR SHEET-LIKE MATERIALS

CROSS-REFERENCE TO RELATED APPLICATIONS

The present application claims the benefit of priority of Japanese Patent Application No. 2022-024394, filed on Feb. 21, 2022, the content of which is incorporated herein by reference.

TECHNICAL FIELD

The present invention relates to a joining apparatus for sheet-like materials.

BACKGROUND

In the related art, as a joining technique to join sheet-like materials such as cloth, there is a fusing apparatus using ultrasonic waves. In this fusing apparatus, two sheet-like materials made of thermoplastic resin overlap each other and the overlapping two sheet-like materials are fused by ultrasonic waves, and then fused end portions of the two sheet-like materials are thermally welded by fusing the materials. Unlike sewing with sewing thread, when cut end portions of the two sheet-like materials joined by such fusing apparatus are widened, there is no protrusion that becomes a seam allowance, so that a flat finish can be achieved.

However, since there is almost no joining margin (overlapping part of materials by joining) at a boundary portion between the two sheet-like materials, it is difficult to increase joining strength and there is a risk of generating a gap due to tension. Therefore, a band-like tape is stuck along the boundary portion to straddle the boundary portion between the two sheet-like materials (for example, refer to JP5244052B).

SUMMARY

As described above, to flatten the boundary portion between two sheet-like materials and secure sufficient joining strength therebetween, a fusing apparatus that performs joining work using ultrasonic waves and a sticking apparatus that performs tape sticking work have been used.

The fusing apparatus of the related art is required to fuse the two sheet-like materials while the two sheet-like materials overlap each other, and the tape sticking apparatus is required to stick a tape on the two sheet-like materials while unfolded.

Therefore, after fusing work is completed over the entire length of a planned joining area while the two sheet-like materials overlap each other, it is required to unfold the two sheet-like materials and stick a tape on the boundary portion therebetween using the sticking apparatus.

Since it is essential to perform work of unfolding the two sheet-like materials at a joined end portion, the fusing work by ultrasonic waves and the tape sticking work cannot be continuously conveyed, thereby making it difficult to continuously perform the fusing work and the tape sticking work.

An object of the present disclosure is to provide a joining apparatus capable of continuously conveying joining work of two sheet-like materials and tape sticking work and continuously performing the same.

An aspect of the present disclosure is a joining apparatus for sheet-like materials, the apparatus including:

a fusing mechanism part configured to join two thermoplastic sheet-like materials by fusing;

a sticking mechanism part configured to stick an adhesive tape along a joined portion of the two sheet-like materials by the fusing mechanism part;

a workbench having a placement surface on which the fusing mechanism part and the sticking mechanism part are disposed side by side, the placement surface allowing the two sheet-like materials in an unfolded state to be placed thereon; and a guide configured to allow an end portion to be joined of one of the two sheet-like materials and an end portion to be joined of the other sheet-like material to overlap each other while aligned along a plane intersecting the placement surface, each of the end portions to be joined being placed on the placement surface, and to feed the overlapping end portions to be joined of the two sheet-like materials, wherein the fusing mechanism part fuses and joins the end portions to be joined of the two sheet-like materials fed from the guide in an overlapping state to sandwich the end portions to be joined from opposite sides thereof.

The present embodiment is not required to perform work of unfolding two sheet-like materials between joining work using ultrasonic waves and tape sticking work, thereby making it possible to perform the joining work and the tape sticking work continuously and efficiently.

BRIEF DESCRIPTION OF DRAWINGS

FIG. 9 is a rear view showing another example of the guide.

DESCRIPTION OF EMBODIMENTS

[Outline of Embodiment]

Figure 1:
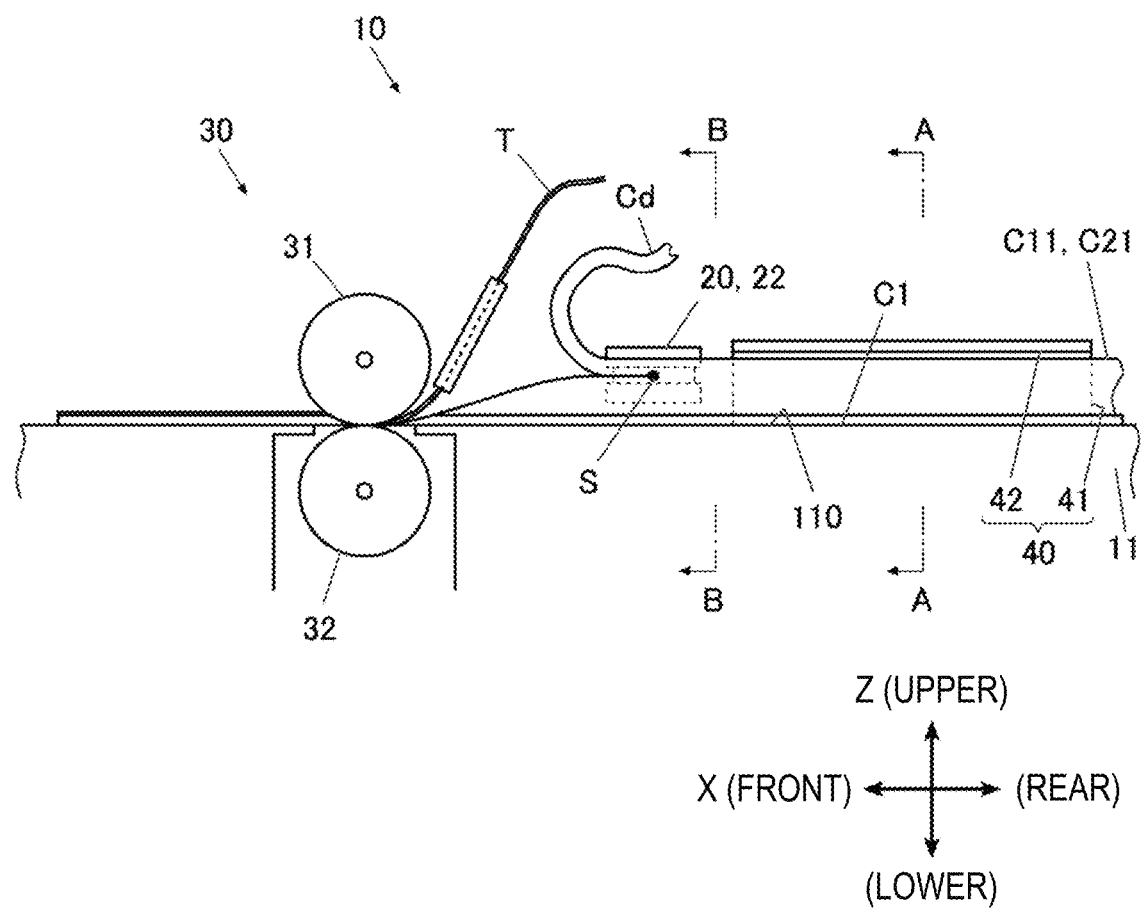
FIG. 1 is a side view showing a configuration of a main part of a joining apparatus according to an embodiment of the present disclosure.

Hereinafter, a detailed description will be given as to a joining apparatus 10 for a clothing material as a sheet-like material, which is an embodiment of the present disclosure, with reference to the drawings. FIG. 1 is a side view showing a configuration of a main part of the joining apparatus 10.

The joining apparatus 10 can join sheet materials C1 and C2 having thermal plasticity.

The joining apparatus 10 performs joining work by allowing respective end portions to be joined of the two sheet-like materials C1 and C2 to abut on each other.

Therefore, the joining apparatus 10 includes a fusing mechanism part 20 configured to join the two sheet-like materials C1 and C2 by fusing of ultrasonic waves, a sticking mechanism part 30 configured to stick an adhesive tape T along a joined portion C12 (refer to FIG. 4) of the two sheet-like materials C1 and C2 by the fusing mechanism part 20, a workbench 11 having a placement surface 110 on which the two sheet-like materials C1 and C2 in an unfolded state are placed, and a guide 40 configured to allow an end portion to be joined C11 of one sheet-like material C1 placed on the placement surface 110 and an end portion to be joined C21 of the other sheet-like material C2 placed on the placement surface 110 to overlap each other while the end portions to be joined C11 and C21 are aligned along a plane perpendicular to the placement surface 110, and to feed the overlapping end portions.

Note that the "unfolded state" refers to a state in which most of the two sheet-like materials C1 and C2 are spread to not overlap each other. The "unfolded state" includes, for example, a state in which only small parts of the end portions to be joined C11 and C21 overlap each other.

The workbench 11 includes the placement surface 110, and the guide 40, the fusing mechanism part 20, and the sticking mechanism part 30 are disposed in order from the upstream side in the conveyance direction along the conveyance direction parallel to the placement surface 110.

The placement surface 110 is horizontal while the joining apparatus 10 is installed on the horizontal surface.

In the following description, the feeding direction of the sheet-like materials C1 and C2 along the placement surface 110 is defined as an X-axis direction, the direction parallel to the placement surface 110 and orthogonal to the X-axis direction is defined as a Y-axis direction, and the vertical upward-and-downward direction is defined as a Z-axis direction.

The downstream side in the feeding direction of the sheet-like materials C1 and C2 parallel to the X-axis direction is defined as "front", and the upstream side is defined as "rear". In the state parallel to the Y-axis direction and facing forwards, the left side is defined as "left" and the right side is defined as "right". One of the Z-axis directions is defined as "up" and the other is defined as "down".

[Guide]

Figure 2:
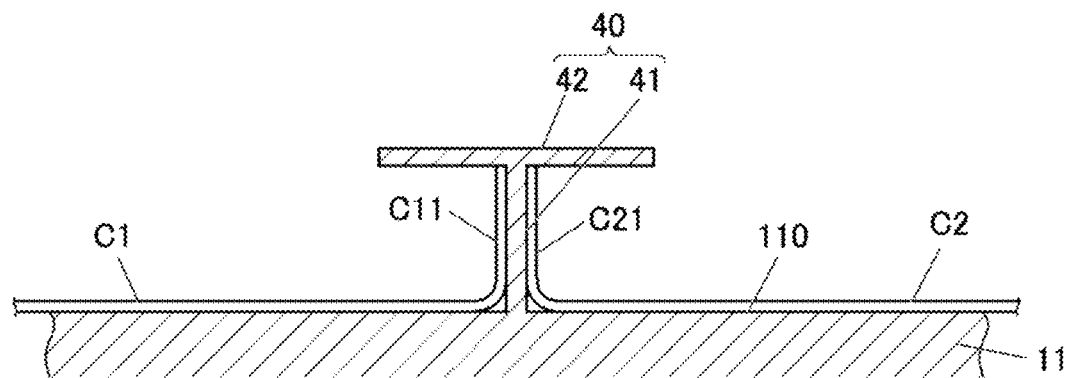
FIG. 2 is a cross-sectional view of the periphery of a guide taken along line A-A in FIG. 1.

FIG. 2 is a cross-sectional view of the periphery of the guide 40 taken along line A-A in FIG. 1.

As illustrated, the guide 40 includes a vertical guide part 41 erected vertically upwards from the placement surface 110 and an abutting part 42 provided at the upper end portion of the vertical guide part 41.

The vertical guide part 41 is a long flat plate parallel to the X-Z plane on the placement surface 110 and formed to extend in the X-axis direction, and the upper end portion thereof has a uniform height over the entire length in the X-axis direction.

The abutting part 42 is a long flat plate parallel to the X-Y plane and formed to extend in the X-axis direction, and an intermediate portion in the Y-axis direction of the lower surface thereof is integrally connected to the upper end portion of the vertical guide part 41.

The two sheet-like materials C1 and C2 are placed separately on the left and right sides of the vertical guide part 41 of the guide 40 while being spread flat on the placement surface 110. When the two sheet-like materials C1 and C2 are brought close to the vertical guide part 41, only the respective end portions to be joined C11 and C21 are aligned along the vertical guide part 41, thereby making it possible for the end portions to be joined C11 and C21 to be erected vertically upwards with respect to the placement surface 110.

When the two sheet-like materials C1 and C2 are brought close to the vertical guide part 41, tip portions of the end portions to be joined C11 and C21 abut on the lower surface of the abutting part 42, thereby allowing the heights of the tip portions of the end portions to be joined C11 and C21 to be aligned.

The front end portion of the guide 40 extends up to the vicinity of the fusing mechanism part 20. When the two sheet-like materials C1 and C2 are fed forwards while being brought close to the side of the vertical guide part 41, only the respective end portions to be joined C11 and C21 can be vertically erected and can be fed to the fusing mechanism part 20 while the heights of the tip portions thereof are aligned.

The work of feeding the two sheet-like materials C1 and C2 to the fusing mechanism part 20 using the guide 40 is exemplified on the premise that the work is manually performed by an operator, but the present invention is not limited thereto.

For example, the workbench 11 may be provided with a feeding mechanism such as a roller configured to feed the two sheet-like materials C1 and C2 forwards while bringing the same close to the side of the vertical guide part 41, and the sheet-like materials C1 and C2 may be fed thereto using a drive source.

[Fusing Mechanism Part]

The fusing mechanism part 20 joins the two sheet-like materials C1 and C2 by fusing. Therefore, the sheet-like materials C1 and C2 are made of thermoplastic resin that is easily fused by heat, such as polyvinyl chloride, polyethylene, polypropylene, polystyrene, acrylonitrile butadiene styrene (ABS), acrylonitrile styrene (AS), polymethyl methacrylic, polyvinyl alcohol, polyvinylidene chloride, polyethylene terephthalate, polyamide, polyacetal, polycarbonate, polyphenylene ether, polybutylene terephthalate, and polyvinylidene fluoride resin. Alternatively, the sheet-like materials C1 and C2 are made of a compound partially containing such resin components or a component obtained by adding an additive to such resin components. The same are made of a sheet-like or tape-like member containing other thermoplastic materials or the like.

Figure 3:
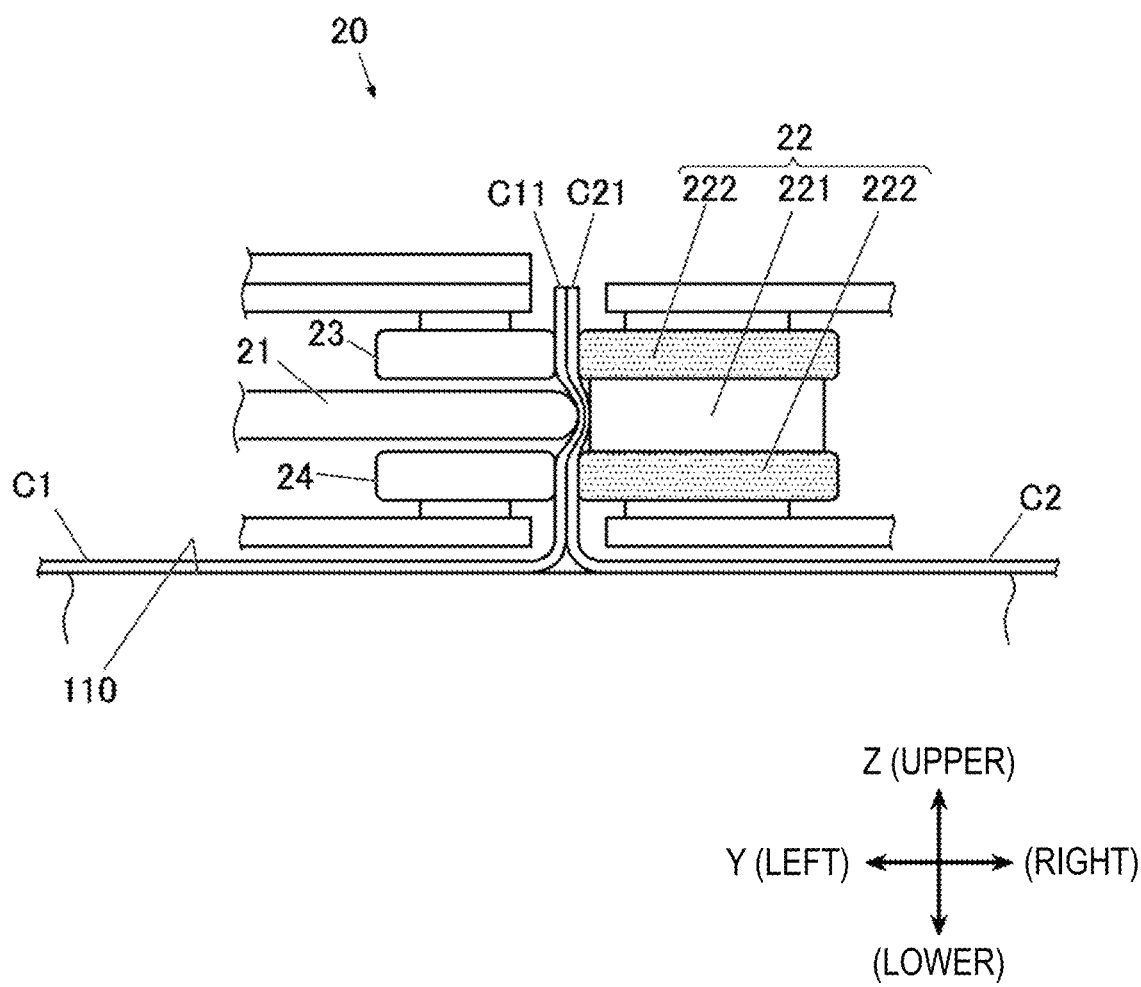
FIG. 3 is a cross-sectional view of the front side of a fusing mechanism part taken along line B-B in FIG. 1.
Figure 4:
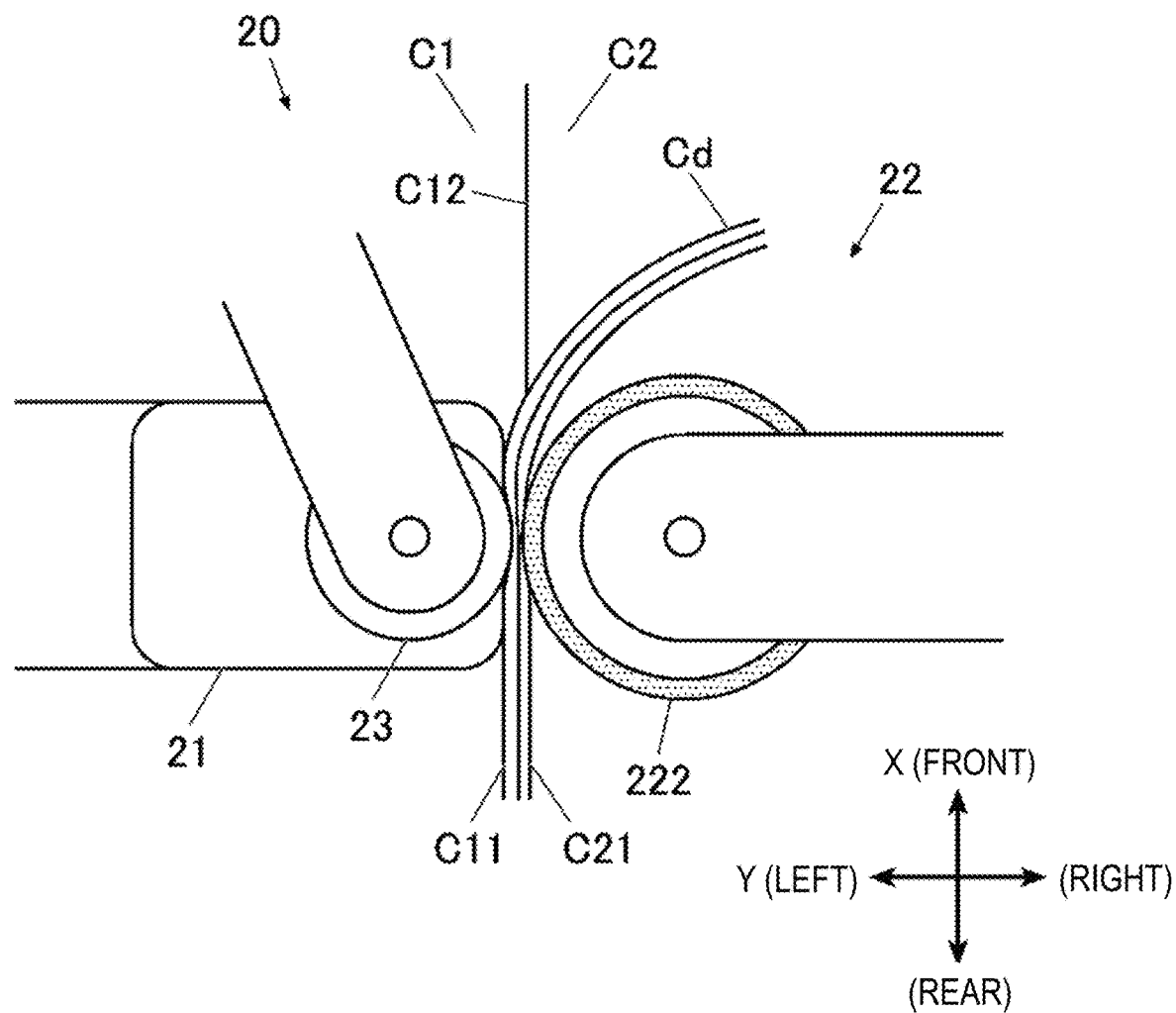
FIG. 4 is a plan view of the fusing mechanism part.

FIG. 3 is a cross-sectional view of the front side of the fusing mechanism part 20 taken along line B-B in FIG. 1, and FIG. 4 is a plan view of the fusing mechanism part 20.

As shown in the drawings, the fusing mechanism part 20 includes a horn 21 and an anvil 22 disposed to sandwich the end portions to be joined C11 and C21 overlapping each other along the X-Z plane from the opposite sides in the X-axis direction, and feeding rollers 23 and 24 respectively serving as feed bodies configured to feed the end portions to be joined C11 and C21 forwards to pass through the horn 21 and the anvil 22.

The horn 21 extends in the Y-axis direction, has a tip portion extending rightwards, and closely faces the anvil 22. The base end portion of the horn 21 is connected to a a vibrator configured to generate mechanical vibration at an ultrasonic vibration frequency (not shown) and a cone configured to amplify ultrasonic vibration.

The vibrator is, for example, a so-called bolt tightened Langevin type vibrator using a piezo element. A high-frequency pulse voltage of, for example, 16 to 40 kHz is applied to the vibrator to generate ultrasonic vibration. The frequency is an example and is not limited thereto.

The tip portion of the horn 21 is in contact with the anvil 22 at one point or closely faces the same with a minute gap therebetween. As shown in FIG. 3, the tip portion of the horn 21 is rounded in front view, and linearly contacts the end portion to be joined C11 passing through a space between the horn 21 and the anvil 22 in the X-axis direction.

On the other hand, as shown in FIG. 4, the anvil 22 has a roller shape, and contacts the end portion to be joined C21 on the circular peripheral surface in plan view. Therefore, the end portions to be joined C11 and C21 sandwiched between the tip portion of the horn 21 and the outer periphery of the anvil 22 concentrate on one point, and ultrasonic vibration is inputted to the one point, so that fusing work can be effectively performed.

Note that the horn 21 and the anvil 22 may be configured to be supported to be relatively movable toward and away from each other.

The horn 21 and the anvil 22 may be provided with an actuator configured to enable the horn 21 and the anvil 22 to move toward and away from each other. Here, it is possible to adjust a gap between the horn 21 and the anvil 22 by controlling an operation amount of the actuator.

Alternatively, an adjustment mechanism that can manually adjust the gap between the horn 21 and the anvil 22 may be provided.

As described above, the anvil 22 has a roller shape and is rotatably supported around the Z axis.

The anvil 22 has a small diameter part 221 at the center in the Z-axis direction, the outer periphery of which faces the tip portion of the horn 21, and large diameter parts 222 having a slightly larger diameter than that of the small diameter part 221 are respectively provided on the opposite sides of the small-diameter part 221.

The outer peripheral surface of the small-diameter part 221 is in contact with the tip portion of the horn 21 or is close thereto with a small gap therebetween, and fusing work of the end portions to be joined C11 and C21 is performed on the outer peripheral surface thereof. The contact or approach position between the small diameter part 221 and the horn 21 is slightly lower than the lower surface of the abutting part 42 of the guide 40 described above.

The two large diameter parts 222 are disposed to respectively contact the feeding rollers 23 and 24, which will be described later, or respectively close to the same with a small gap therebetween. The outer peripheral surfaces of the large diameter parts 222 and the feeding rollers 23 and 24 are formed of a material having a large coefficient of friction, or are provided with a structure (knurling or the like) to increase the coefficient of friction.

Then, the end portions to be joined C11 and C21 of the sheet-like materials C1 and C2 are sandwiched between the large diameter portions 222 and the feeding rollers 23 and 24, and the end portions to be joined C11 and C21 can be fed forwards by driving rotation of the feeding rollers 23 and 24 and driven rotation of the anvil 22.

Each of the feeding rollers 23 and 24 is connected to a motor (not shown) serving as a driving source via a power transmission mechanism such as a gear or a belt mechanism, and performs rotational driving to feed the end portions to be joined C11 and C21 of the sheet-like materials C1 and C2 forwards. The feeding rollers 23 and 24 rotate at the same speed and in the same direction.

Either one of the feeding rollers 23 and 24 and the anvil 22 may be configured to be supported to be relatively movable toward and away from the other.

The feeding rollers 23 and 24 may be provided with an actuator configured to enable the same to relatively move toward and away from the anvil 22.

Instead of the feeding rollers 23 and 24 or together with the feeding rollers 23 and 24, the anvil 22 may also be rotationally driven.

Figure 5A:
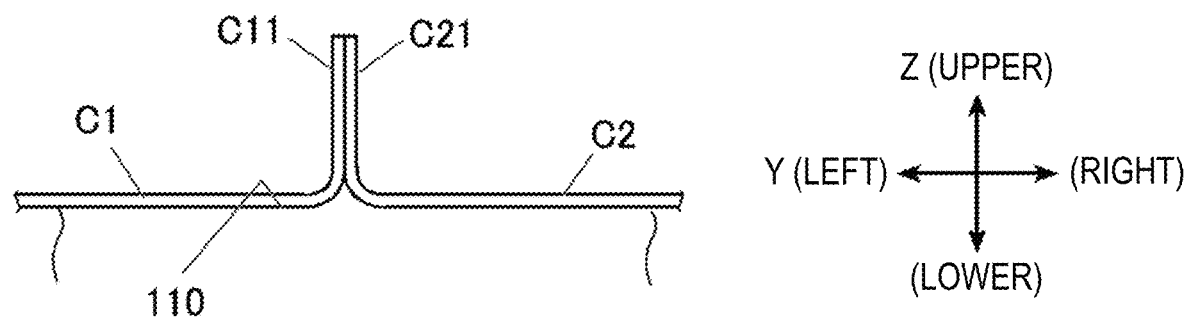
FIGS. 5A to 5C are explanatory views sequentially showing end portions to be joined of two sheet-like materials until the end portions are joined by fusing, as seen from the rear.
Figure 5B:
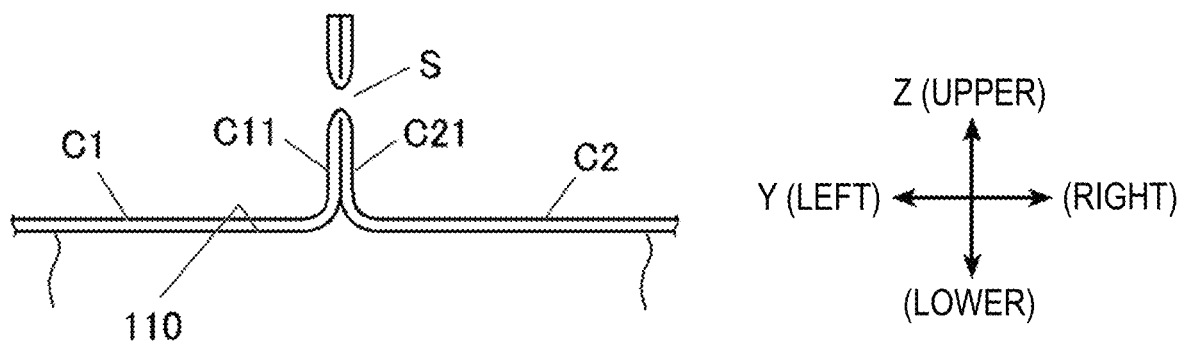
Figure 5C:
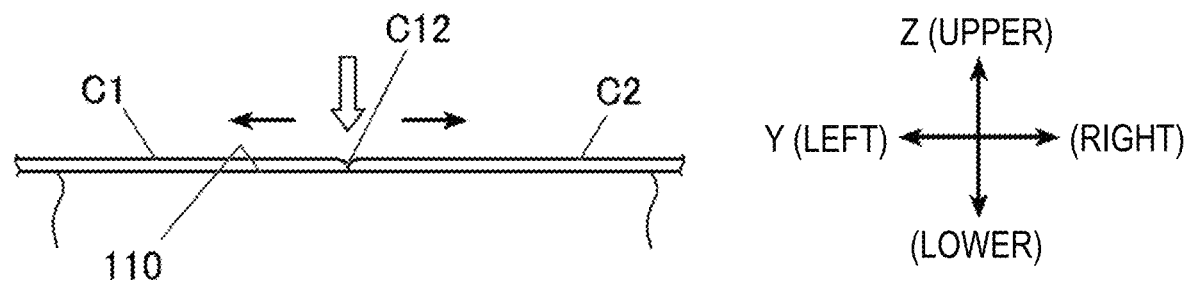

FIGS. 5A to 5C are explanatory views sequentially showing the end portions to be joined C11 and C21 of the two sheet-like materials C1 and C2 until the same are joined by fusing, when seen from the rear.

As shown in FIG. 5A, when the two sheet-like materials C1 and C2 are fed to the side of the fusing mechanism part 20 while only the end portions to be joined C11 and C21 are undulated upwards by the guide 40, the end portions to be joined C11 and C21 are sandwiched between the rotating feeding rollers 23 and 24 and the respective large diameter parts 222 of the anvil 22 and fed forwards.

Here, the end portions to be joined C11 and C21 receive ultrasonic vibration at a point S between the tip portion of the horn 21 and the outer periphery of the small diameter part 221 of the anvil 22 at a position slightly lower than the upper end portions thereof, and the sheet-like materials C1 and C2 are fused at the point S. Since the sheet-like materials C1 and C2 are fed forwards as described above, a fusing portion moves in the X-axis direction and fusing is performed in the X-axis direction.

As a result, a portion above the point S between the tip portion of the horn 21 and the outer periphery of the small diameter part 221 of the anvil 22 is cut and separated from the end portions to be joined C11 and C21 as a cut piece Cd (refer to FIG. 1).

A sorting guide may be provided between the fusing mechanism part 20 and the sticking mechanism part 30, the sorting guide feeding the cut piece Cd in a direction (for example, either left or right direction) away from the feeding direction. The sorting guide is disposed slightly above the point S, thereby making it possible to sort and exclude only the cut piece Cd from the end portions to be joined C11 and C21.

The upper end portions of the end portions to be joined C11 and C21 below the point S are fused in the X-axis direction. Then, after passing through the point S, the end portions to be joined C11 and C21 are cooled by the outside air, and as such, the fused upper end portions of the end portions to be joined C11 and C21 are fixed and joined to each other. A portion joined by fusing in the X-axis direction is referred to as a joined portion C12.

Next, while the sheet-like materials C1 and C2 are unfolded to the left and right together with a forward feeding operation, or while the end portions to be joined C11 and C21 are pressed from above, as shown in FIG. 5C, the whole portion including the upright end portions to be joined C11 and C21 is fed to the sticking mechanism part 30 while being flattened along the placement surface 110.

[Sticking Mechanism Part]

The sticking mechanism part 30 puts the adhesive tape T on the joined portion C12 of the two sheet-like materials C1 and C2 conveyed while unfolded in the X-axis direction, and performs sticking work.

The adhesive tape T has a structure having a planar base material and a welding layer formed on one side of the base material (side of sheet materials C1 and C2).

The welding layer is thermoplastic resin that is easily fused, such as polyvinyl chloride, polyethylene, polypropylene, polystyrene, acrylonitrile butadiene styrene (ABS), acrylonitrile styrene (AS), polymethyl methacryl, polyvinyl alcohol, polyvinylidene chloride, polyethylene terephthalate, polyamide, polyacetal, polycarbonate, polyphenylene ether, polybutylene terephthalate, and polyvinylidene fluoride resin. Alternatively, the welding layer is formed of a compound partially containing such resin components, a component obtained by adding an additive to such resin components, or other thermoplastic materials.

However, the welding layer of the adhesive tape T is preferably made of a material that has a fusing temperature lower than that of the sheet-like materials C1 and C2 and that does not fuse the sheet-like materials C1 and C2 during sticking work. For example, the sheet-like materials C1 and C2 are made of polyamide resin, and the welding layer of the adhesive tape T is made of polyurethane resin.

The base material of the adhesive tape T is preferably made of a material having a higher mechanical strength and a higher fusing temperature than the welding layer.

Figure 6:
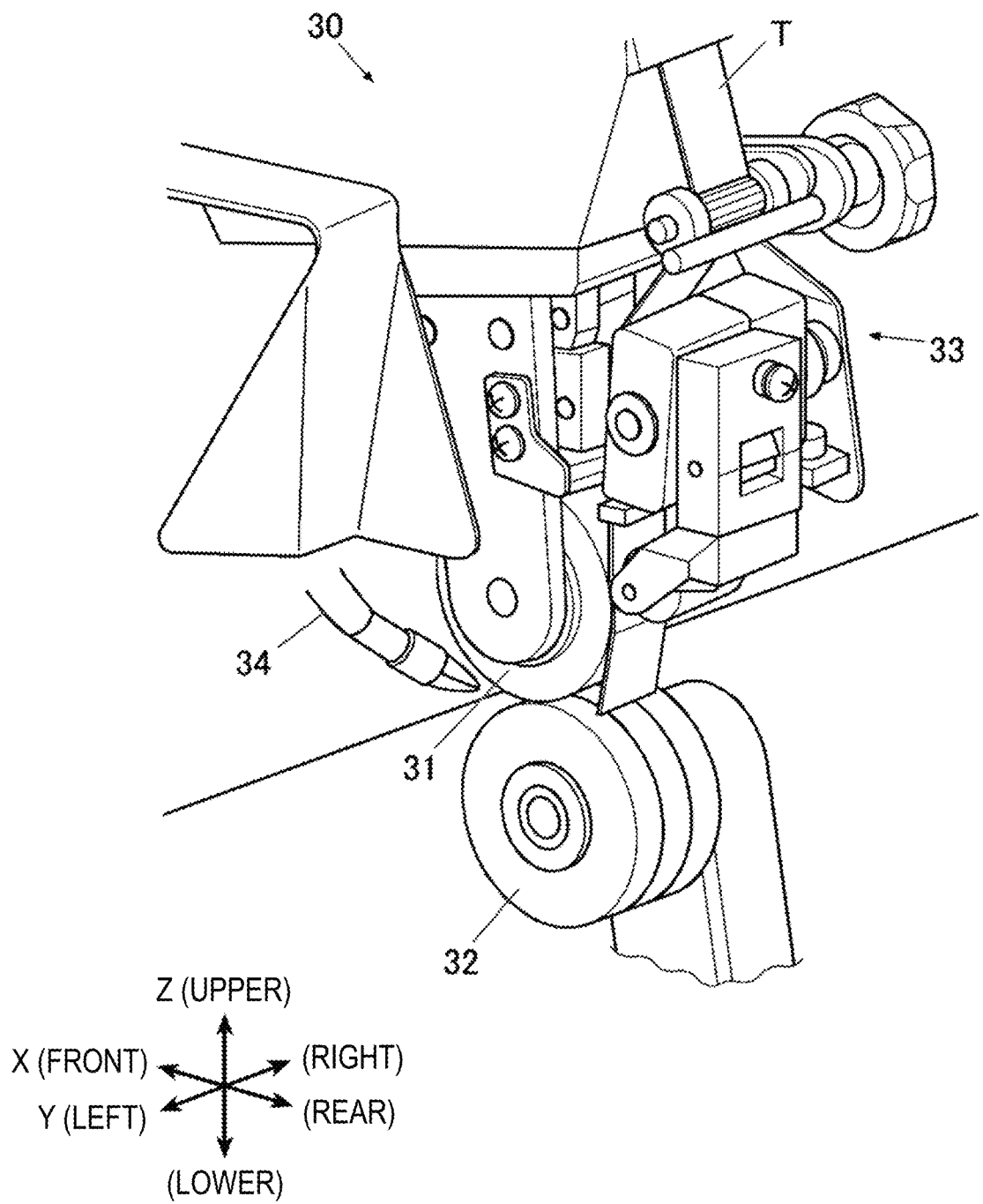
FIG. 6 is a perspective view of a sticking mechanism part.

FIG. 6 is a perspective view of the sticking mechanism part 30.

As shown in the drawing, the sticking mechanism part 30 includes an upper roller 31 and a lower roller 32 respectively serving as rollers configured to sandwich, from above and below, the sheet-like materials C1 and C2 fed from the fusing mechanism part 20 together with the adhesive tape T and to feed the same forwards, a tape guide 33 serving as a tape supply part configured to supply the adhesive tape T from the upper rear side of the upper roller 31 and the lower roller 32, and a heating air nozzle 34 serving as a device configured to heat the adhesive tape T.

At least the outer peripheral surfaces of the upper roller 31 and the lower roller 32 are made of a material having excellent heat resistance and abrasion resistance, such as fluorine resin.

The lower roller 32 is provided inside the workbench 11 so that the upper end portion thereof is at the same height as the placement surface 110 or protrudes upwards slightly above the placement surface 110. The lower roller 32 is driven to rotate around a rotation axis in the Y-axis direction by a motor (not shown) serving as a driving source via a speed reduction mechanism, a power transmission mechanism, and the like.

The upper roller 31 is also driven to rotate in the opposite direction to that of the lower roller 32 around a rotation axis in the Y-axis direction by a motor (not shown) serving as a driving source via a speed reduction mechanism, a power transmission mechanism, and the like.

The lower end portion of the upper roller 31 is in contact with the upper end portion of the lower roller 32 or is disposed close to the same with a minute gap therebetween.

Either one of the upper roller 31 and the lower roller 32 may be supported to be relatively movable toward and away from the other. The upper roller 31 and the lower roller 32 may be provided with an actuator capable of allowing the upper roller 31 and the lower roller 32 to relatively move toward and away from each other.

Note that only one of the upper roller 31 and the lower roller 32 may be configured to be rotationally driven by a driving source, and the other may be configured to perform driven rotation.

The upper roller 31 and the lower roller 32 have a structure in which the sheet-like materials C1 and C2 conveyed from the rear are fed while being sandwiched from above and below. Accordingly, even if the end portions to be joined C11 and C21 reach the upper roller 31 and the lower roller 32 in an upright state, the upper roller 31 and the lower roller 32 press, from above and below, the end portions to be joined C11 and C21 to flatten the same, thereby allowing the adhesive tape T to be stuck on the flattened end portions to be joined C11 and C21.

A flattening guide may be provided between the fusing mechanism part 20 and the sticking mechanism part 30 to widen and flatten the upright end portions to be joined C11 and C21. Such flattening guide may have various structures such as a structure in which the abutting part abutting on the upper end portions of the end portions to be joined C11 and C21 gradually becomes lower in the feeding direction, a structure that enters a gap between the end portions to be joined C11 and C21 and widens the gap therebetween in the feeding direction, and a structure having features of the above-described structures.

For example, the adhesive tape T is held at the upper portion of the sticking mechanism part 30 while wound around a tape reel (not shown), and the tape guide 33 guides the adhesive tape T unwound from the tape reel up to the rear vicinity of a contact point or an approach point between the upper roller 31 and the lower roller 32. The tape guide 33 guides the adhesive tape T so that the center of the Y-axis direction width of the adhesive tape T coincides with an extension line of the vertical guide part 41 of the guide 40 in the Y-axis direction. As a result, when the two sheet-like materials C1 and C2 are conveyed forwards from the fusing mechanism part 20, the adhesive tape T and the sheet-like materials C1 and C2 are drawn to the contact point or the approach point between the upper roller 31 and the lower roller 32. As such, the upright end portions to be joined C11 and C21 are flattened, and the adhesive tape T is stuck along the joined portion C12 from above the joined portion C12.

The tape guide 33 may be provided with a roller configured to convey the adhesive tape T to the upper roller 31 and the lower roller 32 and a driving source configured to drive the roller at each location of the conveyance path of the adhesive tape T. Accordingly, the adhesive tape T can be conveyed along the conveyance path.

Here, a sensor or the like configured to detect the tip portion of the adhesive tape T may be provided in the vicinity of the contact point or the approach point between the upper roller 31 and the lower roller 32, and the driving source of the roller may be controlled so that the tip portion of the adhesive tape T can stand by at an appropriate position.

The appropriate position of the tip portion of the adhesive tape T is, for example, a position at which the tip portion of the adhesive tape T abuts on the leading edge of the sheet-like materials C1 and C2 conveyed from the fusing mechanism part 20 from the rear, and the adhesive tape T and the sheet-like materials C1 and C2 can be easily drawn to a space between the upper roller 31 and the lower roller 32.

The heating air nozzle 34 is connected to an air discharge device and a heater configured to heat the air (not shown), and the same can discharge high-temperature air. The heating air nozzle 34 is disposed at a position and in a direction in which the tip portion thereof can blow high-temperature air from the rear with respect to the contact point or the approach point between the upper roller 31 and the lower roller 32.

As a result, it is possible to fuse the welding layer of the adhesive tape T that is drawn together with the sheet-like materials C1 and C2 to the contact point or the approach point between the upper roller 31 and the lower roller 32.

The welding layer of the adhesive tape T is fused right before the contact point or the approach point between the upper roller 31 and the lower roller 32. Accordingly, after passing through the upper roller 31 and the lower roller 32, the adhesive tape T can be stuck on the joined portion C12 of the sheet-like materials C1 and C2 by the welding layer.

Note that the tip portion of the adhesive tape T may be configured to be fed to a space between the upper roller 31 and the lower roller 32 by air pressure from the heating air nozzle 34.

[Overall Operation of Joining Apparatus]

Next, the overall operation of the joining apparatus 10 will be described.

First, the sheet-like material C1 and the sheet-like material C2 are placed on both the left and right sides of the guide 40 on the placement surface 110 of the workbench 11 while spread thereon, respectively.

Then, when the respective end portions to be joined C11 and C21 of the sheet-like materials C1 and C2 are brought close to the side of the vertical guide part 41 of the guide 40, the end portions to be joined C11 and C21 stand up along the vertical guide part 41, and the tip portions of the end portions to be joined C11 and C21 abut on the lower surface of the abutting part 42, and the heights thereof are aligned.

When the two sheet-like materials C1 and C2 are fed forwards while maintaining the above state, the end portions to be joined C11 and C21 contact each other and reach the fusing mechanism part 20 while maintaining the upright state.

In the fusing mechanism part 20, the upright end portions to be joined C11 and C21 are sandwiched between the rotating feeding rollers 23 and 24 and the large diameter portions 222 of the anvil 22, and fed forwards. Then, at the point S between the tip portion of the horn 21 and the outer periphery of the small diameter portion 221 of the anvil 22, fusing is performed in the X-axis direction.

As a result, the upper end portions of the end portions to be joined C11 and C21 from which the cut piece Cd is cut are fused, joined, and conveyed to the side of the sticking mechanism part 30.

In the sticking mechanism part 30, the sheet-like materials C1 and C2 and the adhesive tape T supplied from above are drawn to a space between the upper roller 31 and the lower roller 32. Here, the upright end portions to be joined C11 and C21 are flattened, and the adhesive tape T is stuck on the joined portion C12 along the joined portion C12.

[Technical Effects of Joining Apparatus]

The joining apparatus 10 includes the guide 40 that allows the end portion to be joined C11 of one sheet-like material C1 placed on the placement surface 110 of the workbench 11 and the end portion to be joined C21 of the other sheet-like material C2 placed on the placement surface 110 of the workbench 11 to overlap each other and feeds the overlapping end portions while the two end portions to be joined C11 and C21 are aligned along a plane perpendicular to the placement surface 110. The fusing mechanism part 20 is configured to fuse and join the end portions to be joined C11 and C21 of the two sheet-like materials C1 and C2 fed from the guide 40 while overlapping each other to sandwich the same from the opposite sides thereof.

Therefore, unlike the case where the sheet-like materials C1 and C2 entirely overlap each other to be fused, joining work by fusing can be performed while almost the entire sheet-like materials C1 and C2 are unfolded on the placement surface while only the end portions to be joined C11 and C21 overlap each other.

Accordingly, by pressing, from above, only the upright end portions to be joined C11 and C21 of the sheet-like materials C1 and C2 that have passed through the fusing mechanism part 20, the sheet-like materials C1 and C2 can be unfolded without overlapping each other.

Therefore, it is not required to perform the work of unfolding the sheet-like materials C1 and C2 between the fusing mechanism part 20 and the sticking mechanism part 30, and by continuously conveying the sheet-like materials C1 and C2 from the fusing mechanism part 20 to the sticking mechanism part 30, it is possible to continuously perform joining work by fusing and sticking work of the adhesive tape T. As a result, work efficiency can be dramatically improved.

Since the fusing mechanism part 20 fuses and joins the end portions to be joined C11 and C21 of the two sheet-like materials C1 and C2 by ultrasonic waves, it is easy to concentrate on fusing of a material in a narrow area.

Accordingly, in the unfolded state after the two sheet-like materials C1 and C2 are joined, the joined portion C12 can be flattened without forming a protrusion.

Since the fusing mechanism part 20 has the horn 21 and the anvil 22, preferable ultrasonic vibration can be applied to the end portions to be joined C11 and C21 of the sheet-like materials C1 and C2 between the horn 21 and the anvil 22, thereby making it possible to smoothly perform fusing work.

The sticking mechanism part 30 includes the upper roller 31 and the lower roller 32 that flattens and feeds the joined portion C12 of the two sheet-like materials C1 and C2 joined by the fusing mechanism part 20, and the tape guide 33 that supplies the adhesive tape T from the upstream side in the feeding direction of the upper roller 31 and the lower roller 32.

Therefore, even if the end portions to be joined C11 and C21 of the sheet-like materials C1 and C2 conveyed from the fusing mechanism part 20 are in the upright state, the adhesive tape T can be stuck on the end portions to be joined C11 and C21 while the upper roller 31 and the lower roller 32 flatten the end portions to be joined C11 and C21.

Therefore, it is possible to continuously convey the sheet-like materials C1 and C2 between the fusing mechanism part 20 and the sticking mechanism part 30 more smoothly, thereby making it possible to further improve work efficiency.

Since the fusing mechanism part 20 has the feeding rollers 23 and 24 that perform operation of feeding the end portions to be joined C11 and C21 of the sheet-like materials C1 and C2 in a direction passing through the fusing position, the same can perform operation of feeding the sheet-like materials C1 and C2 to the sticking mechanism part 30 while performing fusing.

Therefore, it is possible to automatically perform conveyance from the fusing mechanism part 20 to the sticking mechanism part 30 without relying on manual labor.

Since the guide 40 has the vertical guide part 41 configured to allow the end portions to be joined C11 and C21 of the two sheet-like materials C1 and C2 to be aligned along the vertical plane, the sheet-like materials C1 and C2 can be easily put into the upright state and maintained in the upright state simply by bringing the two sheet-like materials C1 and C2 close to the side of the vertical guide part 41.

Since the guide 40 has the abutting part 42 configured to abut on the tip portions of the end portions to be joined C11 and C21 of the two sheet materials C1 and C2 and to align the same, fusing can be performed while the tip portions of the end portions to be joined C11 and C21 of the sheet materials C1 and C2 are aligned, thereby making it possible not only to prevent the sheet-like materials C1 and C2 from being joined to each other in an uneven state, but also to maintain high quality of the sheet-like materials C1 and C2 after joining.

[Another Example of Sticking Mechanism Part]

Figure 7:
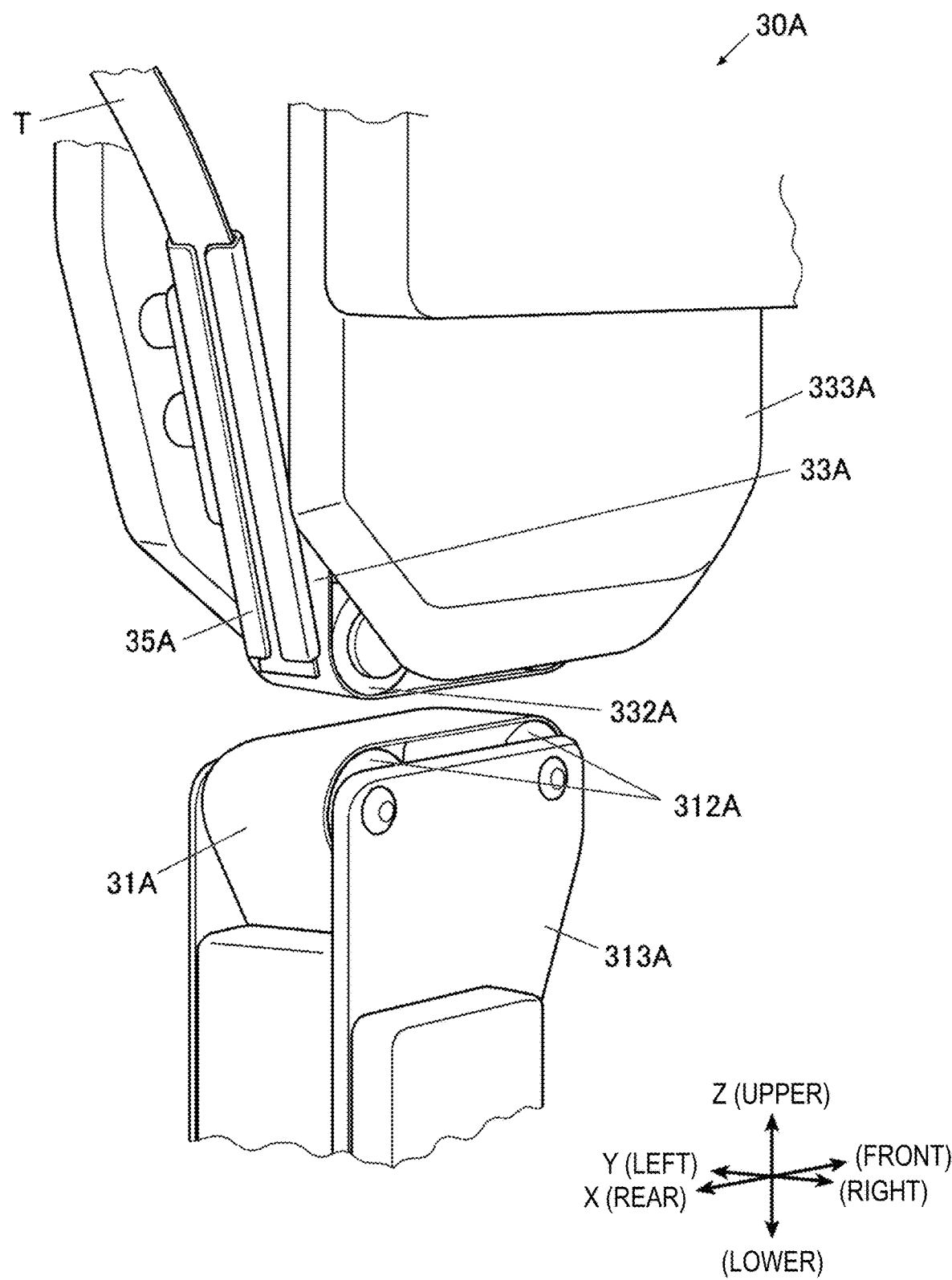
FIG. 7 is a perspective view showing a schematic configuration of another example of the sticking mechanism part.
Figure 8:
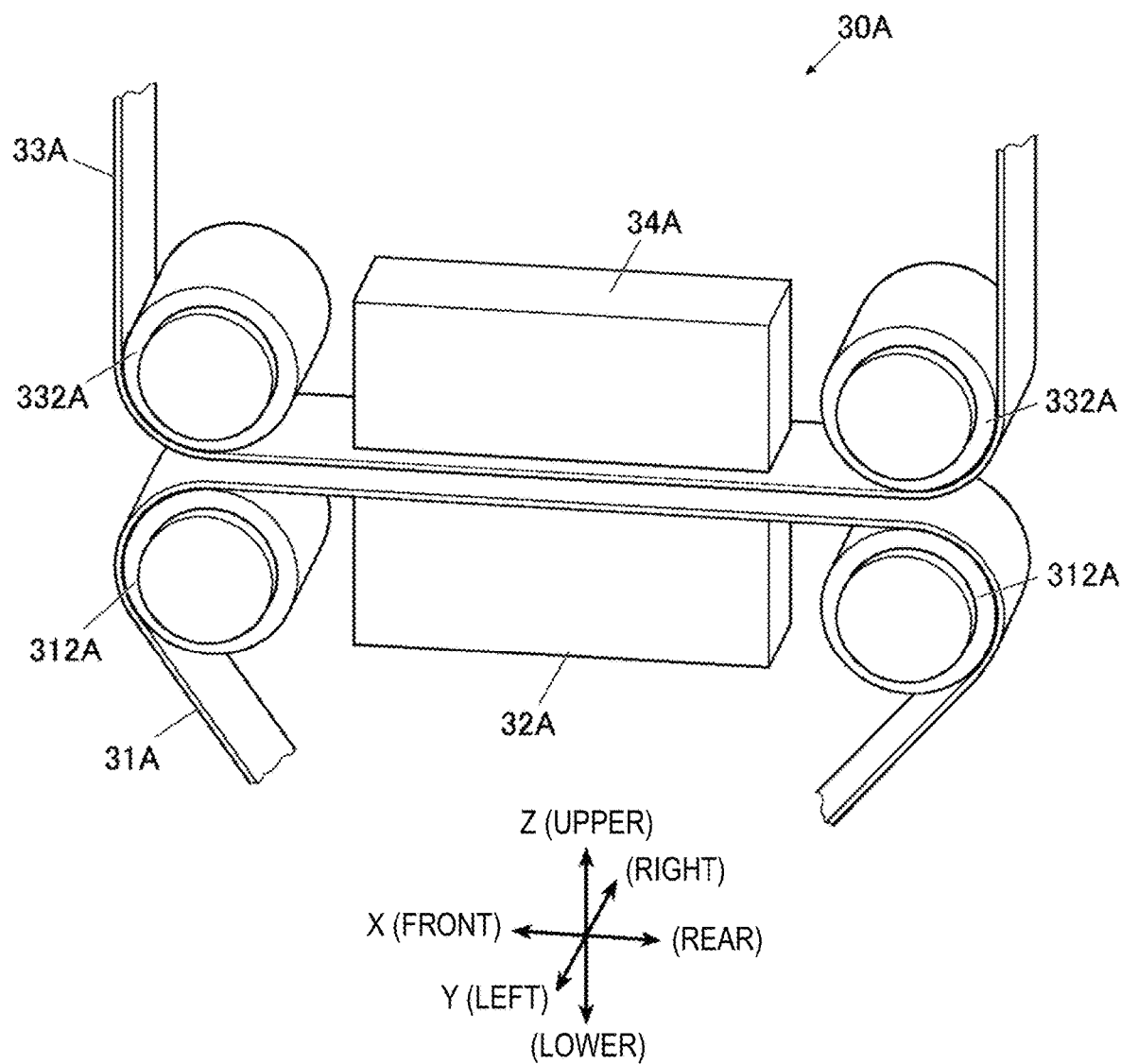
FIG. 8 is a perspective view of the periphery of a sticking portion.

Here, another example of the sticking mechanism part will be described. FIG. 7 is a perspective view showing a schematic configuration of a sticking mechanism part 30A, and FIG. 8 is a perspective view showing the periphery of a sticking portion.

As shown in the drawings, the sticking mechanism part 30A includes a lower belt 31A that feeds the two sheet-like materials C1 and C2 in the unfolded state and the adhesive tape T in the X-axis direction, a lower heater 32A that heats the adhesive tape T via the lower belt 31A, an upper belt 33A that feeds the sheet-like materials C1 and C2 and the adhesive tape T in the same direction as that of the lower belt 31A, an upper heater 34A that heats the adhesive tape T via the upper belt 33A, and a tape guide 35A that feeds the adhesive tape T between the upper belt 33A and the two sheet-like materials C1 and C2 to be fed.

The lower belt 31A is, for example, an endless annular belt formed of a material having excellent heat resistance and abrasion resistance, such as fluorine resin, and the same is stretched over a plurality of rollers 312A supported by a support frame 313A to be rotatable around the Y axis. Each roller 312A is partially or wholly rotationally driven by a motor (not shown).

At the upper end portion of the support frame 313A, the lower belt 31A can contact the sheet-like materials C1 and C2 from below in a horizontal section between the two rollers 312A disposed side by side in the X-axis direction and feed the same forwards.

The lower heater 32A is disposed inside the lower belt 31A and disposed between the two rollers 312A respectively positioned in the front and rear, and the same heats the sheet-like materials C1 and C2 via the lower belt 31A.

The upper belt 33A is also an endless annular belt made of a material having excellent heat resistance and abrasion resistance, such as fluorine resin, and the same is stretched over a plurality of rollers 332A supported by a support frame 333A to be rotatable around the Y axis. Each roller 332A is partially or wholly rotationally driven by a motor (not shown).

At the lower end portion of the support frame 333A, the upper belt 33A can contact the sheet-like materials C1 and C2 from above in a horizontal section between the two rollers 332A disposed side by side in the X-axis direction and feed the same in the X-axis direction.

The upper heater 34A is disposed inside the upper belt 33A and disposed between the two rollers 332A respectively positioned in the front and rear, and the same heats the sheet-like materials C1 and C2 via the upper belt 33A.

The tape guide 35A has a structure that supports the opposite sides of the adhesive tape T in the width direction. The tape guide 35A is attached to the support frame 333A to further feed, from the rear, the adhesive tape T to the roller 332A located at the rear of the two rollers 332A located at the lower part.

At least one of the support frames 313A and 333A may be provided with an actuator configured to move upwards and downwards so that the support frames 313A and 333A can relatively move toward and away from each other.

When the support frames 313A and 333A are disposed close to each other and the joined sheet-like materials C1 and C2 joined by fusing between the lower belt 31A and the upper belt 33A are conveyed, the the joined sheet-like materials C1 and C2 and the adhesive tape T are drawn to a space between the lower belt 31A and the upper belt 33A, so that the adhesive tape T can be conveyed while being heated.

Accordingly, the adhesive tape T can be stuck along the joined portion C12 of the sheet-like materials C1 and C2.

Since such sticking mechanism part 30A also includes the lower roller 312A and the upper roller 332A, even if the end portions to be joined C11 and C21 of the sheet-like materials C1 and C2 conveyed from the fusing mechanism part 20 are in the upright state, the adhesive tape T can be stuck on the end portions to be joined C11 and C21 via the lower belt 31A and the upper belt 33A while the lower roller 312A and the upper roller 332A flattens the end portions to be joined C11 and C21.

OTHERS

The details shown in the above embodiments of the disclosure can be modified as appropriate without departing from the spirit of the invention.

For example, as the guide 40, an example of a configuration has been given in which the end portions to be joined C11 and C21 of the two sheet-like materials C1 and C2 are fed forwards while erected upwards, but a configuration may be adopted to feed the end portions to be joined C11 and C21 forwards while hanging downwards.

For example, as shown in FIG. 9, a guide 40A may be configured by a groove formed on the placement surface 110 of the workbench 11 in the X-axis direction. In such groove-shaped guide 40A, each of the inner walls on the opposite sides of the groove serves as a vertical guide part, and the inner bottom portion of the groove serves as an abutting part.

The end portions to be joined C11 and C21 of the sheet-like materials C1 and C2 spread out on both right and left sides across the groove-shaped guide 40A are inserted into the groove-shaped guide 40A while overlapping each other, thereby making it possible to allow the end portions to be joined C11 and C21 to hang downwards along the X-Z plane. The end portions to be joined C11 and C21 are inserted into the inner bottom surface of the groove-shaped guide 40A, thereby making it possible to align the positions of the tip portions of the end portions to be joined C11 and C21.

Note that when the two sheet-like materials C1 and C2 are fed forwards by the groove-shaped guide 40A, the horn 21, the anvil 22, the feeding rollers 23 and 24, and the like of the fusing mechanism part 20 need to be disposed at a lower position. The upper roller 31, the lower roller 32, the tape guide 33, and the heating air nozzle 34 of the sticking mechanism part 30 are also preferably disposed at a low position.

In the fusing mechanism part 20, the end portions to be joined C11 and C21 of the sheet-like materials C1 and C2 are fused by ultrasonic waves, but the present invention is not limited thereto. For example, another configuration may be used to fuse, by heating, the vicinity of the upper end portions of the end portions to be joined C11 and C21 conveyed forwards in an upright state. For example, a heating wire may be disposed in the Y-axis direction to cross passing positions of the end portions to be joined C11 and C21, and the upper end portion sides of the end portions to be joined C11 and C21 may be fused and joined by heat generated by the heating wire.

Alternatively, the upper end portion sides of the end portions to be joined C11 and C21 may be fused by laser irradiation to perform joining work.

In the sticking mechanism part 30, the heating air nozzle 34 heats the adhesive tape T, but the present invention is not limited thereto. For example, one or both of the upper roller 31 and the lower roller 32 may have a built-in heater for heating.

Although the adhesive tape T has a thermoplastic welding layer in the present embodiment, the present invention is not limited thereto. The adhesive tape T may have an adhesive line or an adhesive layer that does not require heating, and the adhesive tape T may be stuck on the end portions to be joined C11 and C21 by allowing the upper roller 31 and the lower roller 32 to press, from above and below, the adhesive tape T.

What is claimed is:

1. A joining apparatus for sheet-like materials, the apparatus comprising:
    a fusing mechanism part configured to join end portions of two thermoplastic sheet-like materials by fusing to form joined end portions as the two thermoplastic sheet-like materials move in a feeding direction;
    a sticking mechanism part configured to stick an adhesive tape along the joined end portions of the two thermoplastic sheet-like materials after the fusing by the fusing mechanism part;
    a workbench having a placement surface along which the fusing mechanism part and the sticking mechanism part are disposed side by side, the placement surface configured to support the two thermoplastic sheet-like materials in an unfolded state; and
    a guide configured to align the end portions of the two thermoplastic sheet-like materials along a plane intersecting the placement surface, and to enable the end portions to overlap and join along the plane intersecting the placement surface to form the joined end portions during the fusing by the fusing mechanism part and while the two thermoplastic sheet-like materials are in the unfolded state on the placement surface.

2. The joining apparatus according to claim 1, wherein the fusing mechanism part uses ultrasonic waves for the fusing.

3. The joining apparatus according to claim 2, wherein the fusing mechanism part includes a horn and an anvil.

4. The joining apparatus according to claim 1, wherein the sticking mechanism part includes:
    a roller configured to feed the joined end portions of the two thermoplastic sheet-like materials joined by the fusing mechanism part and to flatten the joined end portions along the placement surface; and
    a tape supply part configured to supply the adhesive tape to the roller in the feeding direction.

5. The joining apparatus according to claim 1, wherein the fusing mechanism part includes a feeding body configured to perform a feeding operation in the feeding direction of the overlapped end portions during the fusing.

6. The joining apparatus according to claim 1, wherein the guide includes a vertical guide part configured to align the end portions along the plane intersecting the placement surface.

7. The joining apparatus according to claim 1, wherein the guide includes an abutting part configured to abut on tip portions of the end portions when the end portions are aligned on the guide.

* * * * *